United States Patent [19]

Catalano

[11] 4,405,002
[45] Sep. 20, 1983

[54] PLANING FORM

[76] Inventor: Giordano Catalano, 46 Lindsley Ave., Irvington, N.J. 07111

[21] Appl. No.: 309,825

[22] Filed: Oct. 8, 1981

[51] Int. Cl.³ .............................................. B23Q 3/00
[52] U.S. Cl. .............................. 144/2 R; 144/114 R;
144/144.5 R; 269/221; 269/296
[58] Field of Search ............ 144/144 S, 114 R, 134 R,
144/2 R; 269/221, 244, 296

[56] References Cited

U.S. PATENT DOCUMENTS 2,886,080  5/1959  Rappeport .......................... 269/221

Primary Examiner—W. D. Bray
Attorney, Agent, or Firm—Vogt & O'Donnell

[57] ABSTRACT

A form for taper planing elongated wooden strips of triangular cross section. The form includes a pair of elongated members, each having a beveled surface. The members are aligned with one another so that their respective beveled surfaces cooperatively define a generally V-shaped groove, but the members are free to move towards and away from one another so as to vary the width and hence the depth of the groove. Pairs of screws are disposed at intervals along the lengths of the members, the screws of each such pair being adjacent one another. One screw of each pair is arranged to draw the adjacent portions of the members towards one another and the other screw of each pair is arranged to urge the adjacent portions of the members away from one another so that the screws of each pair may be adjusted to accurately position the adjacent portions of the members while opposing and preloading one another. Guide pins extending laterally of the members and slideable engaged therewith, may be provided to limit relative motion of the members in directions other than towards and away from one another.

11 Claims, 6 Drawing Figures

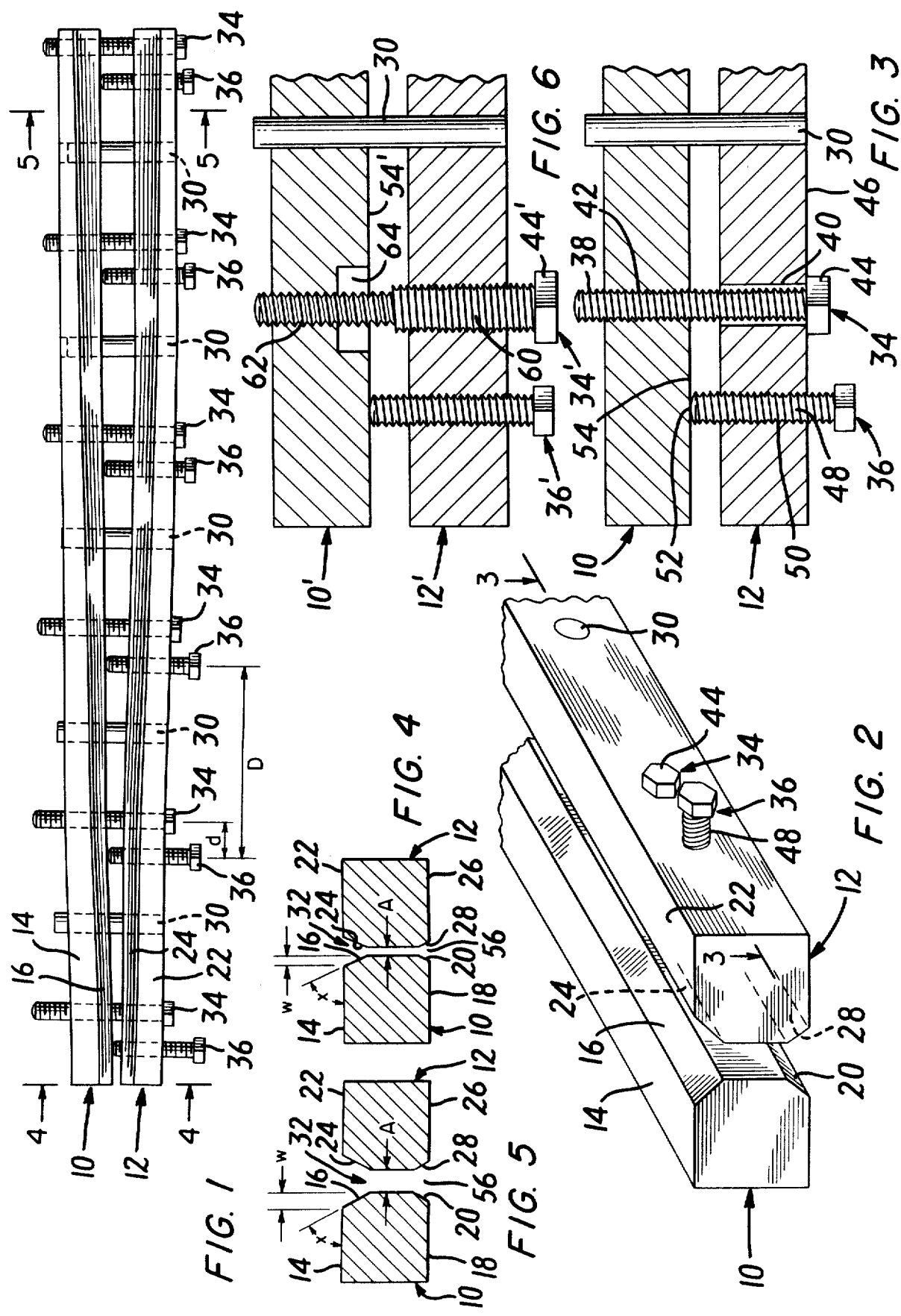

PLANING FORM

BACKGROUND OF THE INVENTION

The shafts used in fine handmade fly fishing rods are normally composite structures made from multiple elongated strips of wood such as bamboo. Such shafts are ordinarily made with a regular polygonal cross section, such as pentagonal or hexagonal and almost universely are made with a progressive taper from a relatively broad cross section at the handgrip end to a slender cross section at the tip. Thus, each of the individual wooden strips used in the shaft must be formed with an accurately tapering triangular cross section. The cross sectional dimensions of each strip in the rod at any given point along its length must be identical to the corresponding dimensions of the other strips to within a few thousandths of an inch for proper performance of the finished rod. Moreover, the desired taper of the shaft cross section and hence the desired taper of each individual strip is ordinarily not uniform along the length of the rod. The desired configuration of each strip may therefore include a relatively rapidly tapering portion merging gradually into a portion having a somewhat lesser taper or decrease in cross sectional dimensions per unit length which section in turn merges gradually into another section having an even lesser taper.

Such strips have generally been made by planing each strip after preliminary treatment of the wood to the desired configuration utilizing a planing form. One type of planing form which has been utilized heretofore is described at pages 67 through 71 of the treatise A Master's Guide to Building a Bamboo Fly Rod by Evrett Garrison and Hoagy B. Carmichael (Martha's Glenn Publishing Co., Katonah, N.Y., 1977). This type of planing form includes a pair of elongated rectangualar bars or members each having a longitudinally extensive beveled surface along one edge. The bars are juxtaposed with one another so that their respective beveled surfaces cooperatively define a generally V-shaped groove. Ordinarily, the beveled surfaces are themselves tapered so that the depth and width of the groove is defined when the bars are disposed parallel to one another at a predetermined, uniform taper per unit length. Control or differential screws are provided at spaced intervals along the length of the bars to permit adjustment of the bars or members towards and away from one another so as to vary the width and depth of the groove. Each such control screw has two screw threads of slightly differing pitch, each such thread extending over a portion of the length of the screw. The portion of greater pitch is threadedly engaged with one of the bars and the portion of lesser pitch is engaged with the other so that rotation of the control screw in one direction will draw the adjacent portions of the members closer to one another and thereby narrow the groove in the vicinity of the control screw, but rotation of the screw in the opposite direction will have the opposite effect.

By adjusting the settings of the control screws, the width and degree of taper of the groove adjacent each control screw can be adjusted until the groove has the desired configuration for the particular rod to be constructed. However, with the planing form described above, such adjustment has been an extremely painstaking and time-consuming process. To achieve a nonuniform taper per unit length, the settings of the control screws must be such that the members are distorted from their normal straight condition. Thus, each control screw will ordinarily be under a substantial load when first adjusted to the desired setting. However, when the next adjacent control screw is adjusted to its desired setting, such load may be removed or reversed in direction, thus producing relative motion or slop between the first adjusted control screw and the members and altering the width of the groove at the first adjusted control screw. Therefore, with the form described above, it has generally been necessary to readjust all of the control screws several times to achieve the desired pattern of groove widths along the length of the form. Whenever the setting of the form is to be changed to produce a rod of a different design, the entire process must be repeated again. Accordingly, the time and effort consumed in setting the control screws has been a substantial problem heretofore.

SUMMARY OF THE INVENTION

The present invention provides a planing form which minimizes the need for repetitive resettings during adjustment of the form to a new configuration and which accordingly is considerably easier to use. The form of the present invention once set to a desired configuration will accurately retain its settings during use.

A form according to the present invention includes a pair of elongated members, each having a beveled surface. Appropriate means are provided for retaining the guide members in substantially coextensive relation with one another so that the beveled surfaces of the guide members cooperatively define a substantially V-shaped groove. Plural pairs of screws are disposed at intervals along the length of the members, the screws of each such pair being adjacent to one another. The form also includes means for connecting one screw of each pair to the members so that such screw will tend to urge the adjacent portions of the members apart from one another upon rotation of the screw and means for connecting the other screw of each pair to the members so that such screw will tend to urge the members towards one another upon rotation of that screw.

With this arrangement, the two screws of each pair can be adjusted so that they position the adjacent portions of the members at the desired distance from one another and so that the two screws of each pair oppose and preload one another. The preload applied to each screw of each pair by the opposing screw of such pair will ordinarily be substantially greater in magnitude than the variations in loading of such screw which may be induced by bending forces applied to the members when the next adjacent pair of screws is set. Accordingly, there is little possibility that the total load or any screw of a pair which has already been set will be reversed in direction during the setting of other pairs. Thus, the setting of other pairs of screws will not induce slop or relative motion at the already set pairs and will not alter the width of the groove adjacent to such already set pairs.

A form according to the present invention may also include means other than the pairs of screws for retaining the members in juxtaposed, substantially coextensive relation with one another, permitting relative movement of the members towards and away from one another but substantially preventing relative movement of the members in other directions. Such retaining means may include a plurality of guide pins extending laterally of the members, each such guide pin being engaged with both of the members, the engagement of each such guide pin with at least one of the members being a slideable engagement. The members are thus free to slide towards and away from one another on the guide pins but cannot shift appreciably in other directions. Because these screws need only control the positioning of the members in the direction towards and away from one another and need not control movement in other directions, there is no need for extreme precision of fit between the screws and the threads with which they are engaged.

These and other objects, features and advantages of the present invention will be more readily understood from the detailed description of the preferred embodiments set forth below taken in conjunction with the accompanying drawings.

BRIEF DESCRIPTION OF DRAWINGS

FIG. 1 is a top plan view of a planing form according to a first embodiment of the present invention, with certain dimensions exaggerated for clarity of illustration.

FIG. 2 is a fragmentary perspective view of the form illustrated in FIG. 1.

FIG. 3 is a fragmentary sectional view taken along lines 3—3 in FIG. 2.

FIGS. 4 and 5 are sectional views taken along lines 4—4 and 5—5, respectively in FIG. 1.

FIG. 6 is a fragmentary sectional view similar to FIG. 3 but depicting a form according to a second embodiment of the present invention.

DETAILED DESCRIPTION OF THE INVENTION

As illustrated in FIGS. 1, 2 and 3, a planing form according to a first embodiment of the present invention includes a pair of elongated members 10 and 12, each of which is formed from a ¾ inch square bar of cold rolled steel about 8 feet long. Member 10 has a planar top surface 14 and a planar beveled surface 16 intersecting such top surface. The angle of intersection x (FIGS. 4 and 5), between top surface 14 and beveled surface 16 is constant over the entire length of member 10. However, the width w of surface 16 (the dimension of such surface in the direction parallel to top surface 14) varies along the length of member 10. Such width is smaller at the left end of member 10, as seen in FIG. 1 and greater at the opposite end of the member. The variation per unit length along member 10 in the width of surface 16 is constant over the entire length of the member, so that the width of such surface varies linearly over the length of the member.

Member 10 has a planar bottom surface 18 and a planar bottom beveled surface 20 anglularly intersecting such bottom surface at a constant angle along the entire length of the member. The width of bottom beveled surface 20 also varies linearly over the entire length of the member.

Member 12 has a planar top surface 22, top beveled surface 24, bottom surface 26 and bottom beveled surface 28 arranged similarly to the corresponding features of member 10.

A plurality of of guide pins 30 (FIGS. 1, 2 and 3) retain members 10 and 12 in opposed relation with one another so that the top surfaces 14 and 22 of the members are coplanar with one another and the top beveled surfaces 16 and 24 of the members define a generally v-shaped groove 32. Each portion of the top beveled surface 16 of member 10 is aligned with the portion of beveled surface 24 on member 12 having the same width. As will be appreciated, the width of groove 32 varies along the length of the form due to the variation in width of the beveled surfaces 16 and 24.

Guide pins 30 extend laterally of members 10 and 12. Each guide pin is fixedly engaged with member 12 but slideably engaged with member 10 so that the members can be moved towards or away from one another to additionally vary the width of groove 32. To control the position of the members, and control the width of the groove, a plurality of pairs of screws are provided. Each such pair includes an adjusting screw 34 and a lock screw 36.

As best seen in FIG. 3, the threaded shank 38 of each adjusting screw 34 extends through a clearance hole 40 in member 12 having a diameter greater than the diameter of the shank, and each such shank also extends through a threaded hole 42 in member 10. Thus, the shank of each adjusting screw is threadedly engaged with member 10 but is not threadedly engaged with member 12. The head 44 of each adjusting screw bears on the surface 46 of member 12 remote from member 10. Such engagement serves to connect each adjusting screw 34 to member 12 so that upon rotation of each screw 34 in the proper direction to advance threaded shank 38 into threaded hole 42 (towards the top of the drawing in FIG. 3) screw 34 will urge the adjacent portions of members 10 and 12 towards one another.

The threaded shank 48 of each lock screw 36 extends laterally of the members through a threaded hole 50 in member 12 such shank being threadedly engaged with such member. The tip 52 of each lock screw bears on the lateral surface 54 of member 10 which faces towards member 12. Thus, upon rotation of screw 36 in the appropriate direction to advance shank 48 in threaded hole 50 (towards the top of the drawing as seen in FIG. 3) the lock screw will tend to force the adjacent portions of members 10 and 12 away from one another.

As best appreciated with reference to FIG. 1, the two screws 34 and 36 of each pair are adjacent one another. That is, the center to center distance d between the adjusting screw and the lock screw of each pair is less than 25% of the center to center distance D between each screw of such pair and the corresponding screw of the next adjacent pair.

Each pair of screws can be operated to position the adjacent portions of members 10 and 12 at the desired distance A (FIGS. 4 and 5) from one another. Of course, any variation in such distance A between the members along the length of the form will produce a corresponding variation in the width of groove 32. Thus, the desired pattern of variation in the width of groove 32 along the length of the form may be selected by operating the various pairs of screws to produce the appropriate variation in the distance A between the members. If the width of the groove is to vary along the length of the form in a non-linear fashion (i.e., if the variation in such width per unit length along the form is not uniform along the length of the form, the distance A must also vary in a non-linear or non-uniform manner). As will be appreciated, such non-uniform variation in the distance A means that each member must bend or deviate from a straight line. To produce such bending, the screws must apply substantial forces to the members and the members will of course apply equal but opposite substantial forces to the screws.

In adjustment of each pair of screws, the two screws of such pair oppose and preload one another, the adjusting screw 34 of each such pair being under tension and the lock screw 36 of such pair being under compression. Because each screw is under load, the threads of such screw bear against the mating threads of the member with which such screw is engaged so that there can be no relative movement or slop between the screws and the members. Thus, the members will be firmly fixed in position once the screws have been adjusted.

As each pair of screws is adjusted, during progressive adjustment of all of the pairs of screws, the pair being adjusted may produce additional bending in the members and thus apply additional forces to the already adjusted pairs. However, such additional forces will generally be of far smaller magnitude than the preloading forces applied by each screw of each pair to the other screw of the same pair. Thus, such additional forces will not release the preload already applied to each screw of each already adjusted pair and will not disturb the adjustment of any already adjusted pair of screws.

Once all of the screws have been adjusted to produce the desired pattern of variation in the width of groove 34 along the length of the form, the form may be used in the same manner as conventional planing forms utilized in the fly fishing rod construction art. A generally triangularly bamboo strip may be placed in groove 32 and planed by a plane drawn along the top of the form. As the strip is progressively planed in this manner, it finally reaches a condition in which it exactly fills the groove and the exposed surface of the strip lies flush with the top surfaces 14 and 22 of the form. In this condition, the width of the strip at each point along its length will be exactly equal to the width of the groove at such point. Of course, the angles between faces of the planed strip will depend on the angle between faces of the form. If the angle x (FIGS. 4 and 5) between beveled surface 16 and top surface 14 of member 10 is 60° and the angle between beveled surface 24 and top surface 22 of member 12 is also 60°, the finished strip will be in the form of an equilateral triangle and the angle between each pair of adjacent faces of the strip will be 60°. Angle x could be 54° so that the finished strip will be in the form of an isosceles triangle and the angle between the pair of equal sides will be 72°.

The planed strip may be further planed to a smaller size by removing the strip from the form, turning the form over and placing the strip into the second generally v-shaped groove 56 defined by bottom bevel surfaces 20 and 28 of members 10 and 12. After the strip has been placed into this groove, the planing process is continued in the same fashion as described above.

For making ordinary fly fishing rods, the form should be about 8 feet long and should have 15 pairs of screws spaced at 5 inch intervals from one another along the length of member 12. The distance d (FIG. 1) between the adjusting screw and lock screw of each pair of screws may be about 1 inch. Preferably, each of the guide pins 30 is disposed midway between two adjacent pairs of screws. Each of the top beveled surfaces 16 and 24 may have a width of about 0.036 inches at one end and about 0.092 inches at the other end. Each of the bottom beveled surfaces may be 0.014 inches wide at one end and 0.069 inches wide at the opposite end. Members 10 and 12 may be formed from ⅜ inch square cold rolled steel bars. It should be clearly understood that the relative dimensions, relative spacing between members and degree of bending in the members illustrated in the drawings are greatly exaggerated for clarity of illustration. In actual practice, adjustments to the spacing of the members are made in thousandths of an inch.

A planing form according to a second embodiment of the present invention is partially illustrated in FIG. 6. This form is identical to the form described above except that each adjusting screw 34' has two co-coaxial threaded sections 60 and 62. Threaded section 60 has relatively fine pitch right-hand threads which are engaged in mating threads on member 12'. Section 62 of adjusting screw 34' has relatively coarse right-hand threads engaged in corresponding threads on member 10'. Thus, on rotation of the screw in the right-hand or clockwise direction as seen from the head of the screw, each such threaded section tends to advance at a different rate relative to the member with which such threaded section is engaged. Because section 62 advances relative to member 10' at a greater rate than section 60 advances relative to member 12', rotation of the screw in this direction will tend to draw the members together. As is the form described above, each lock screw 36' is adjusted so that it tends to force the members apart from one another. Thus, the adjusting screw 34' and lock screw 36' of each pair oppose and preload one another. Each adjusting screw 34' is not connected to member 12' by way of its head 44' but rather by way of the threads on section 60 and the mating threads on member 12'. The head 44' of each adjusting screw remains remote from member 12' during operation of the device. A clearance pocket 64 is formed in the face 54' of member 10' which confronts member 12' at each adjusting screw so that when the members are close to one another threaded section 60 of each adjusting screw may protrude slightly into member 10'.

This arrangement facilitates extremely fine adjustment of the members towards or away from one another. For example, threaded section 60 may be provided with 24 pitch threads having a lead of 0.042 in. Threaded section 62 may be provided with 20 pitch threads having a lead of 0.050 in. Thus, a complete revolution of screw 34' in the clockwise direction as seen from its head will tend to draw members 10' and 12' only (0.050 in. minus 0.042 in.) or 0.008 in. closer to one another. Of course, a fractional rotation of screw 34' will move the members even less. One disadvantage of this arrangement is the additional cost incurred in fabricating special adjusting screws.

In each of the embodiments described above, all of the screws are disposed in a common plane parallel to the top and bottom surfaces of the members and equadistant between such surfaces. Therefore, the forces applied by the screws to the members will not tend to twist the members about their respective axes. This is an important advantage as any such twisting would cause undesirable variation in the width of the groove.

Numerous variations and combinations of the features described above may be utilized without departing from the present invention as recited in the claims. For example, the guide pins 30 may be omitted if the diametral fit between the adjusting screws and the members is close enough that the screws will maintain the desired alignment of the members with one another. The bottom beveled surfaces of the members may be omitted, but the resulting form will have only one groove. Although the coplanar top and bottom surfaces on the members provide good support for the plane during use, and hence are desirable, the same are not absolutely essential.

As these and other variations and combinations of the features described above may be utilized, the foregoing description of the preferred embodiments should be taken by way of illustration rather than by way of limitation of the present invention.

What is claimed is:

1. A form for taper planing elongated wooden strips comprising:
    (a) a pair of elongated members, each such member having a longitudinally extensive beveled surface;
    (b) means for retaining said members in opposed relation with one another so that said beveled surfaces cooperatively define an elongated groove of generally V-shaped cross section and said members being moveable towards and away from one another to vary the width of said groove;
    (c) a plurality of adjusting screws each having a head and a threaded shank, the head of each such adjusting screw engaging one of said members, the shank of each such adjusting screw extending laterally of said members and threadedly engaging only the other one of said members; and
    (d) a plurality of lock screws, each such lock screw extending laterally of said members, threadedly engaging only one of said members and bearing upon the other one of said members, there being one such lock screw adjacent to each one of said adjusting screws, whereby each of said adjusting screws together with the associated one of said lock screws may be operated to adjust and control the distance between said members in the vicinity of such adjusting screw.

2. A form as claimed in claim 1 in which each of said members has a planar, longitudinally extensive top surface angularly intersecting the beveled surface of such member, said retaining means being operative to maintain said top surfaces coplanar with one another.

3. A form as claimed in claim 2 in which, over the major portion of the longitudinal extent of said members, each of said beveled surfaces is planar and intersects the associated top surface at a constant angle, the angle of such intersection in both of said members being of substantially equal magnitude.

4. A form as claimed in claim 3 in which the width of the beveled surface of each of said members varies linearly in the longitudinal direction of such member over at least the major portion of the length thereof, said members being aligned with one another so that portions of the respective beveled surfaces having width of the same magnitude are aligned with one another.

5. A form as claimed in claim 1 or claim 4 in which said retaining means includes a plurality of guide pins extending laterally of said members, and engaged with both of said members, the engagment between each of said guide pins and at least one of said members being a slideable engagement.

6. A form as claimed in claim 5 in which each of said members is about 8 feet long, said form including at least fifteen of said adjusting screws, each of said intervals between adjacent ones of said adjusting screws being approximately five inches.

7. A form as claimed in claim 6 in which each of said lock screws is disposed within one inch of the associated adjusting screw.

8. A form as claimed in claim 7 in which the included angle between said beveled surfaces is about 60°.

9. A form as claimed in claim 7 in which the included angle between said beveled surfaces is about 72°.

10. Apparatus as claimed in claim 7 in which each of said members has a planar bottom surface opposite from and substantially parallel with the top surface of such member and a second beveled angularly intersecting such bottom surface, said second bevel surfaces cooperatively defining a second generally v-shaped groove, said bottom surfaces being substantially coplanar with one another.

11. A form for taper planing elongated wooden strips comprising:
    (a) a pair of elongated members, each said member having a longitudinally extensive beveled surface;
    (b) means for retaining said members in opposed relation with one another so that said beveled surfaces cooperatively define an elongated groove of generally v-shaped cross section and said members are moveable towards and away from one another to vary the width of said groove;
    (c) a plurality of pairs of screws, the screws of each such pair being disposed adjacent one another, said pairs of screws being disposed at intervals along the lengths of said members;
    (d) means for connecting one screw of each of said pairs of said members so that upon rotation of such screw, such screw will urge the adjacent portions of said members toward one another; and
    (e) means for connecting the other screw of each of said pairs of screws to said member so that upon rotation of such screw, such screw will urge the adjacent portions of said members away from one another, whereby each of said pairs of screws may be uprighted to control the relative positions of the portions of said members adjacent thereto and maintain such relative positions with the screws of such pair opposite and preloading one another.

* * * * *